R. EVANS.
Fruit Picker.
No 79,455.
Patented June 30, 1868.
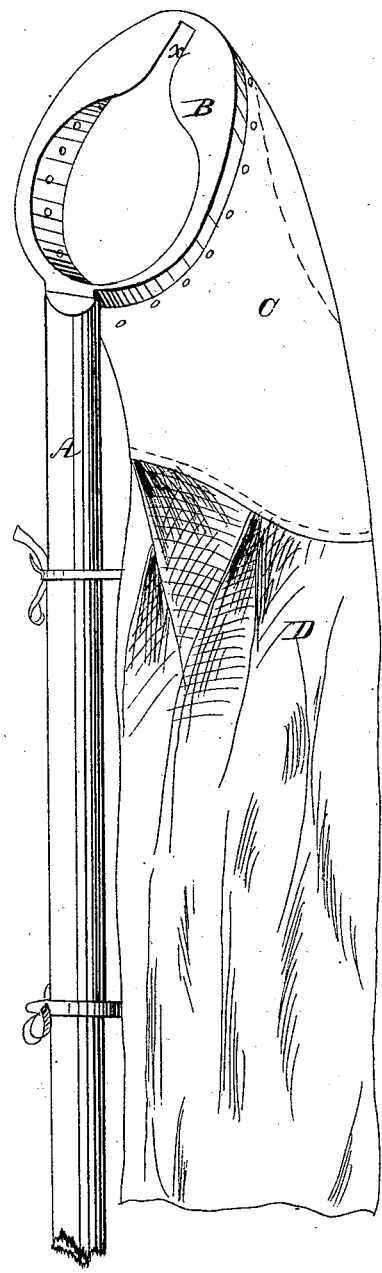

United States Patent Office.

RALPH EVANS, OF BRANT, NEW YORK.

Letters Patent No. 79,455, dated June 30, 1867.

IMPROVEMENT IN FRUIT-PICKER.

*The Schedule referred to in these Letters Patent and making part of the same.*

TO ALL WHOM IT MAY CONCERN:

Be it known that I, RALPH EVANS, of Brant, in the county of Erie, and in the State of New York, have invented certain new and useful Improvements in Fruit-Pickers; and do hereby declare that the following is a full, clear, and exact description thereof, reference being had to the accompanying drawings, and the letters of reference marked thereon.

In the annexed drawings, making a part of this specification—

A represents a suitable staff or handle, of any required length, to which is secured the metallic hoop or band B. The band B is provided with a suitable stem or projection, by which it is attached to the handle A, at an angle therewith. Said band B is also provided with flanges, projecting in toward its centre, in or between which is a notch, $x$, as shown. The edges of the flange next to the notch are sharpened, the better to cut the stem or detach the fruit from the tree.

The operator takes the handle and carries the band B up over the fruit, and by means of the hooking-cut of the notch $x$, said fruit is readily cut or pulled from the tree, and conducted to the place desired, by means of the leather tube or guide C, and the soft or flexible tube D.

The leather tube is fastened to the band B in any suitable manner.

Having thus fully described my invention, what I claim as new, and desire to secure by Letters Patent, is—

The metallic casting B, having a flange on its under side, and slotted so as to form a knife, and provided with an angular stem, as and for the purposes set forth.

In testimony that I claim the foregoing, I have hereunto set my hand and seal, this 24th day of February, 1868.

RALPH EVANS. [L. S.]

Witnesses:
L. C. CALL,
JOSEPH HALL.